United States Patent [19]
Albani et al.

[11] Patent Number: 5,835,346
[45] Date of Patent: Nov. 10, 1998

[54] LOW PROFILE DESK TOP COMPUTER

[75] Inventors: David Joseph Albani, Holden; Robert John McCaffrey, Dracut; David Wilfred Tardiff, Tyngsborough, all of Mass.; Yun-Long Tun, Tu-Cheng, Taiwan; Daniel C. Tyo, Pepperell, Mass.

[73] Assignee: Digital Equipment Corporation, Maynard, Mass.

[21] Appl. No.: 671,217

[22] Filed: Jun. 27, 1996

[51] Int. Cl.[6] .................................. G06F 1/16; H05K 7/04
[52] U.S. Cl. .......................... 361/684; 361/683; 361/724; 361/725
[58] Field of Search ..................................... 361/683–685, 361/724, 725, 752, 796, 790, 784; 312/223.1, 223.2; 364/708.1; 439/928.1; G06F 1/16

[56] References Cited

U.S. PATENT DOCUMENTS

| | | | |
|---|---|---|---|
| 5,036,481 | 7/1991 | Lunsford et al. | 364/708.1 |
| 5,218,514 | 6/1993 | Huynh et al. | 361/683 |
| 5,235,493 | 8/1993 | Yu | 361/685 |
| 5,337,464 | 8/1994 | Steffes | 361/683 |
| 5,338,214 | 8/1994 | Steffes et al. | 361/683 |
| 5,438,476 | 8/1995 | Steffes | 361/683 |
| 5,513,329 | 4/1996 | Pecone | 395/281 |
| 5,596,483 | 1/1997 | Wyler | 361/683 |
| 5,650,910 | 7/1997 | Winick et al. | 361/683 |
| 5,675,472 | 10/1997 | Hamerton-Kelly | 361/684 |

OTHER PUBLICATIONS

COMPAQ Prolinea Apr. 1966, at least by Jun., 1995.
"COMPAQ Beyond Setup," pp. 7–1 –7–7, Apr. 1995.
Hewlett–Packard Leaflet, 1995.

*Primary Examiner*—Lynn D. Feild
*Attorney, Agent, or Firm*—Krishnendu Gupta

[57] ABSTRACT

A low profile personal computer includes an enclosure having a bottom wall. A riser card including functional circuitry extends vertically from the bottom wall and partitions the enclosure into first and second regions. A motherboard is positioned within the first region of the enclosure along the bottom wall and adjacent to the riser card for interfacing with the riser card. A series of horizontal option card interfaces are located above each other on the riser card within the first region of the enclosure each for interfacing with a corresponding option card and to position the option cards horizontally over the motherboard. The horizontal option card interfaces are capable of interfacing with a maximum of three option cards at the same time. The functional circuitry on the riser card minimizes the number of option cards which enables the overall height of the enclosure to be minimized.

16 Claims, 3 Drawing Sheets

LOW PROFILE DESK TOP COMPUTER

BACKGROUND

Desk top personal computers typically house the motherboard to the computer along the bottom wall of the computer enclosure. In some designs, a vertically oriented riser card is also housed within the enclosure and includes a series of interface connectors for interfacing with the motherboard as well as for interfacing with a series of option cards which can be added to increase the capabilities of the computer over those already provided by the motherboard. The option card interface connectors are oriented horizontally on the riser card and are positioned above each other. When option cards are installed, the option cards extend horizontally over the motherboard in a vertical stack. Most personal computers provide enough space in the enclosure for a stack of five option cards to be installed over the motherboard.

SUMMARY OF THE INVENTION

A drawback of providing sufficient space in a computer enclosure for housing a vertical stack of five option cards over the motherboard is that the height of the enclosure is relatively high.

The present invention is capable of providing a personal computer having the same capabilities as a computer including five option cards while at the same time having an enclosure with a lower profile than previously possible with a computer of such capabilities. The present invention computer includes an enclosure having a bottom wall. A riser card including functional circuitry extends vertically from the bottom wall and partitions the enclosure into first and second regions. A motherboard is positioned adjacent to the riser card within the first region of the enclosure along the bottom wall to interface with the riser card. A series of horizontal option card interfaces are located on the riser card within the first region of the enclosure, each for interfacing with a corresponding option card and to position such option cards horizontally over the motherboard. The horizontal option card interfaces are vertically disposed relative to each other and are capable of interfacing with a maximum of three option cards at the same time. The functional circuitry on the riser card minimizes the number of option cards that would typically be installed which enables the overall height of the enclosure to be minimized.

In preferred embodiments, the riser card is mounted to a partition wall. A vertical interface circuitry card is positioned within the second region of the enclosure perpendicular to the bottom wall for interfacing with the riser card. The partition wall has an opening to allow a cable to interface with the riser card in the first region of the enclosure and pass through the partition and enter the second region of the enclosure to interface with the vertical interface circuitry card. The first region of the enclosure also houses a disk drive and an air duct while the second region of the enclosure also houses a power supply and hard drive.

The present invention includes functional circuitry on the riser card which provides functions typically added to a computer through the installation of option cards. Consequently, the number of option cards that an average computer user would typically wish to add to the present invention computer is reduced. As a result, less space is made available for installing option cards so that the enclosure in the present invention can be made more compact.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
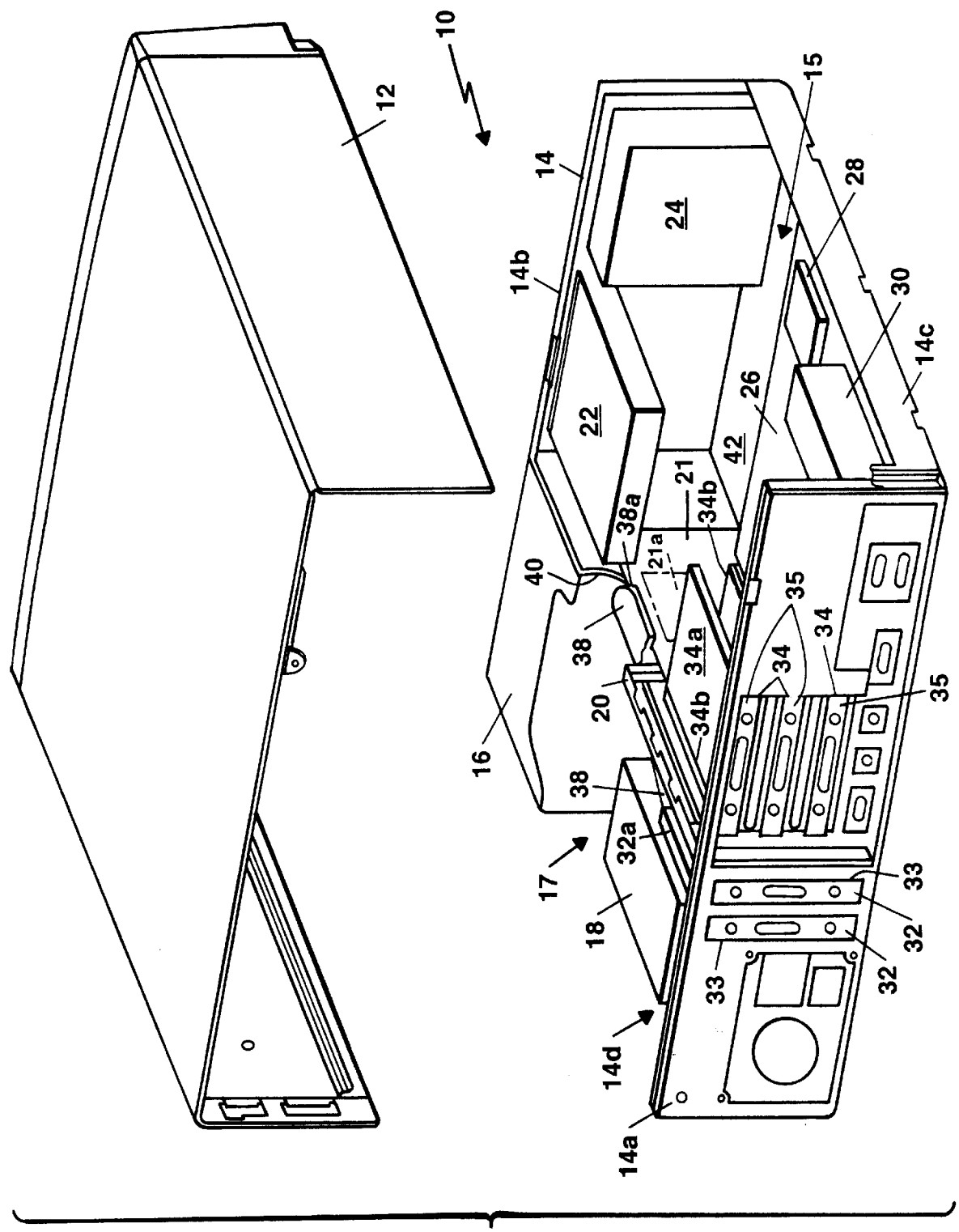
FIG. 1 is a perspective view of the present invention computer.
Figure 2:
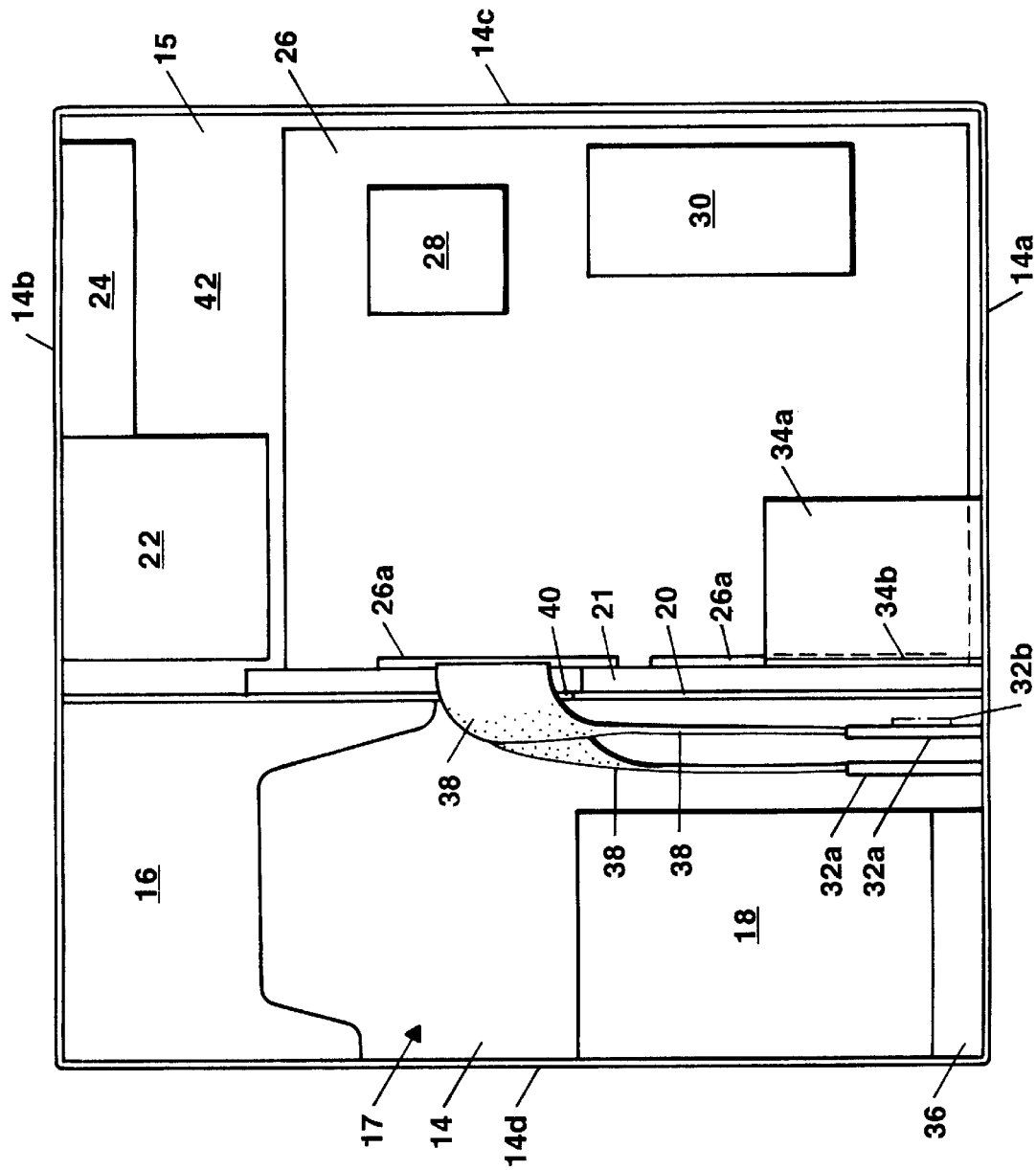
FIG. 2 is a plan view of the present invention computer.
Figure 3:
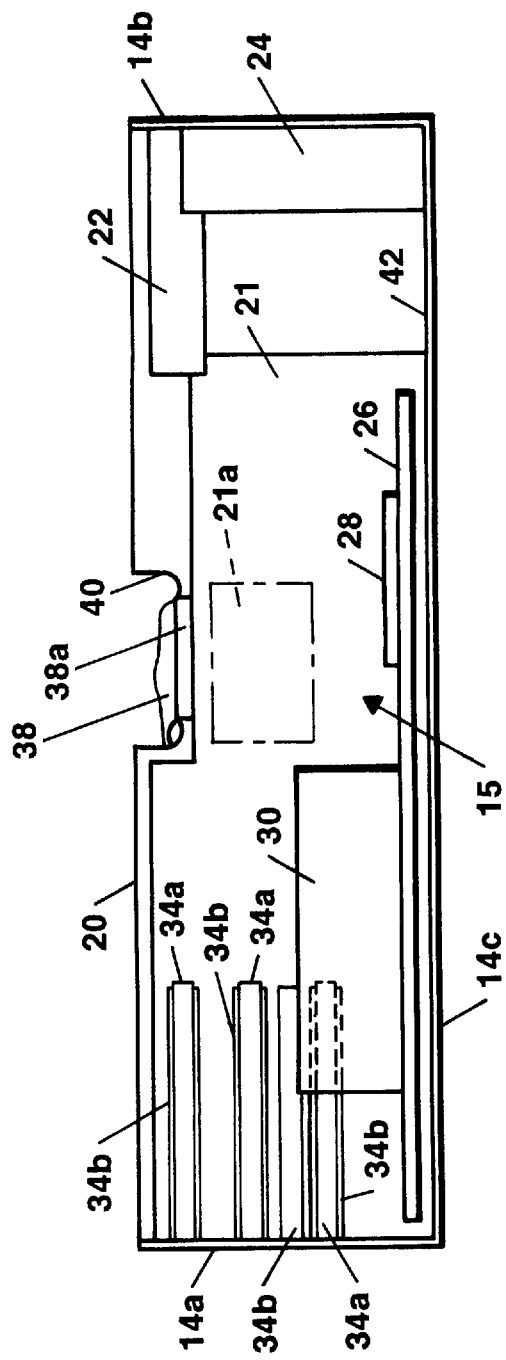
FIG. 3 is an end view of the present invention computer.

Referring to FIGS. 1, 2 and 3, desk top computer 10 includes an enclosure having a base 14 and a top cover 12. Base 14 houses the components of computer 10 and is divided into two regions 15 and 17 by a partition wall 20 which extends between walls 14a and 14b. Region 15 houses a motherboard 26 for controlling computer 10, an air-duct 24 for cooling motherboard 26, a disk drive 22 for accepting 3½ inch disks and a riser card 21 which is mounted in a vertical orientation to partition wall 20. Disk drive 22 and air duct 24 are located above motherboard 26 and are mounted along wall 14b of base 14. Region 17 houses a power supply 36 (FIG. 2), a hard drive 18 and a drive bay 16. The hard drive 18 is preferably positioned above the power supply 36. The hard drive 18 and power supply 36 are located adjacent to wall 14a and side 14d of base 14. Drive bay 16 is positioned along wall 14b and side 14d. Drive bay 16 can house a 5¼ inch disk drive, a CD-ROM rive, a tape drive or another hard drive.

Motherboard 26 is positioned in region 15 along the bottom wall 42 of base 14 in a horizontal orientation and interfaces with riser card 21 via interface connectors 26a (FIG. 2). Typically, motherboard 26 is guided into region 15 along two opposing sides by a pair of guides and is then locked in place within base 14 by a pair of ejector levers rotatably coupled to the motherboard 26. The CPU 28 and memory 30 for computer 10 are positioned along the edge of motherboard 26 near side 14c of base 14 for easy access when top cover 12 is removed.

Riser card 21 includes a series of interface connectors 34b which are oriented horizontally on the riser card 21 for interfacing with option cards 34a. Option cards 34a can optionally be installed in computer 10 to increase the capabilities of computer 10. Standard option cards typically include sound, graphics, modem, CD-ROM interface, I/O and disk drive controller cards. The horizontal interface connectors 34b are spaced above each other on riser card 21 to extend option cards 34a horizontally over motherboard 26 and in a vertical stack. The horizontal interface connectors 34b can be ISA bus connectors, PCI bus connectors, VESA bus connectors, or combinations thereof. In the preferred embodiment, there are four horizontal interface connectors 34b with two connectors 34b being of one type of bus connector and the other two connectors 34b being of another type of bus connector. Although four interface connectors 34b are provided, base 14 is designed to accept a maximum of only three option cards 34a at the same time. As previously mentioned, there are preferably four horizontal interface connectors 34b. However, alternatively, only three horizontal interface connectors 34b can be provided.

When installed, access to option cards 34a is provided through slots 35 in wall 14a. Option cards 34a include interface connectors 34 which extend through slots 35 to allow option cards 34a to be interfaced by cables with corresponding external devices. In the preferred embodiment, there are three slots 35. If a slot 35 is not used for a corresponding option card 34a, the slot 35 can be covered by a filler plate.

Riser card 21 also includes functional circuitry 21a for providing functions which are commonly provided by standard option cards. For example, circuitry 21a can provide sound and modem functions, thereby eliminating the need for installing a sound or modem option card.

Typically, the functional circuitry 21a provides functions normally provided by two standard option cards, but alternatively, can provide more than two or less than two functions. Additionally, non-standard functions can also be provided by functional circuitry 21a.

By providing two functional features on riser card 21 which are normally provided by standard option cards, the number of option cards that would be added to computer 10 by an average user in most cases is reduced by two option cards. As a result, the overall height of the computer 10 can be reduced by the amount of space required to house two option cards. For example, the height of a computer 10 is just over 4 inches high while prior art computer enclosures can be as high as 6.5 inches. This not only provides a compact desk top computer enclosure which saves space, but is also more visually pleasing than a high computer enclosure.

A pair of cables 38 interface with riser card 21 via a pair of interface connectors 38a for interfacing with circuitry 21a. Each cable 38 interfaces with a particular function provided by circuitry 21a. Cables 38 extend from riser card 21 in region 15 into region 17 through a recess 40 in partition wall 20. Cables 38 then run between partition wall 20 and power supply 36/hard drive 18 to interface with two vertical interface circuitry cards 32a. Each cable 38 interfaces with a separate vertical interface circuitry card 32a. The vertical interface circuitry cards 32a are vertically positioned side-by-side within region 17 against wall 14a between partition wall 20 and power supply 36/hard drive 18. Each vertical interface circuitry card 32a includes an interface connector 32 extending through a slot 33 in wall 14a for interfacing with an external device corresponding to a function provided by circuitry 21a. For example, when circuitry 21a includes sound and modem functions, connectors 32 interface with a respective modem and speakers. In one preferred embodiment, vertical interface circuitry cards 32a and interface connectors 32 only provide exterior interface connections from circuitry 21a to external devices. Alternatively, in another preferred embodiment, vertical interface circuitry cards 32a can also include functional circuitry 32b for providing functions which are available through option cards such as network capabilities. If a slot 33 is not occupied by a vertical interface circuitry card 32a, that slot can be covered by a filler plate.

Equivalents

While this invention has been particularly shown and described with references to preferred embodiments thereof, it will be understood by those skilled in the art that various changes in form and details may be made therein without departing from the spirit and scope of the invention as defined by the appended claims. For example, although the use of a riser card 21 having functional circuitry 21a and vertical interface circuitry cards 32a have been depicted for use in a desk top computer enclosure, such features can also be used in a computer tower enclosure. Additionally, circuitry 21a and 32b can provide more than two functions thereby increasing the capacity of computer 10 or reducing the number of option cards 34a. Furthermore, although the figures depict computer 10 as providing space for two vertical interface circuitry cards 32a and three option cards 34a, alternatively, base 14 can provide space for two or less option cards 34a and more than two vertical interface circuitry cards 32a. Base 14 can also provide space only for one vertical interface circuitry card 32a.

What is claimed:

1. A personal computer comprising:

an enclosure having a bottom wall;

a riser card extending vertically from the bottom wall partitioning the enclosure into first and second regions, the riser card including functional circuitry;

a motherboard positioned within the first region of the enclosure along the bottom wall and adjacent to the riser card, the motherboard interfacing with the riser card;

a series of horizontal option card interfaces located on the riser card within the first region of the enclosure each for interfacing with a corresponding option card and to position said option cards horizontally over the motherboard, said horizontal option card interfaces being vertically disposed relative to each other and capable of interfacing with a maximum of three option cards at the same time wherein the functional circuitry on the riser card minimizes the number of option cards which enables the overall height of the enclosure to be minimized; and a vertical interface circuitry card interfacing with the riser card, the vertical interface circuitry card being located remotely from the motherboard and positioned within the enclosure perpendicular to the bottom wall.

2. The computer of claim 1 further comprising a partition wall for mounting the riser card thereto.

3. The computer of claim 2 in which the vertical interface circuitry card is positioned within the second region of the enclosure adjacent to the partition wall.

4. The computer of claim 3 in which the partition wall has an opening to allow a cable to pass therethrough from the first region of the enclosure to the vertical interface circuitry card.

5. The computer of claim 1 further comprising a power supply and a hard drive positioned within the second region of the enclosure.

6. The computer of claim 5 further comprising a disc drive and an air duct positioned within the first region of the enclosure.

7. A personal computer comprising:

an enclosure having a bottom wall;

a riser card extending vertically from the bottom wall partitioning the enclosure into first and second regions, the riser card including functional circuitry;

a motherboard positioned within the first region of the enclosure along the bottom wall and adjacent to the riser card, the motherboard interfacing with the riser card;

a series of horizontal option card interfaces located on the riser card within the first region of the enclosure each for interfacing with a corresponding option card and to position said option cards horizontally over the motherboard, said horizontal option card interfaces being vertically disposed relative to each other and capable of interfacing with a maximum of three option cards at the same time; and at least two vertical interface circuitry cards interfacing with the riser card, the vertical interface circuitry cards being located remotely from the motherboard and positioned within the enclosure perpendicularly to the bottom wall, wherein the functional circuitry on the riser card minimizes the number of option cards which enables the overall height of the enclosure to be minimized.

8. The computer of claim 7 further comprising a partition wall for mounting the riser card thereto.

9. The computer of claim 8 in which the vertical interface circuitry cards are positioned within the second region of the enclosure adjacent to the partition wall.

10. The computer of claim 9 in which the partition wall has an opening to allow cables to pass therethrough from the first region of the enclosure to the vertical interface circuitry cards.

11. The computer of claim 7 further comprising a power supply and a hard drive positioned within the second region of the enclosure.

12. The computer of claim 11 further comprising a disc drive and an air duct positioned within the first region of the enclosure.

13. A method of minimizing the height of an enclosure for a personal computer comprising the steps of:

partitioning the enclosure into first and second regions with a riser card extending vertically from a bottom wall of the enclosure;

providing the riser card with functional circuitry;

positioning a motherboard within the first region of the enclosure along the bottom wall and adjacent to the riser card, the motherboard interfacing with the riser card;

locating a series of horizontal option card interfaces on the riser card within the first region of the enclosure each for interfacing with a corresponding option card to position said option cards horizontally over the motherboard, said horizontal option card interfaces being vertically disposed relative to each other and capable of interfacing with a maximum of three option cards at the same time, wherein the functional circuitry on the riser card minimizes the number of option cards which enables the overall height of the enclosure to be minimized; and interfacing a vertical interface circuitry card with the riser card, the vertical interface circuitry card being located remotely from the motherboard and positioned within the enclosure perpendicular to the bottom wall.

14. The method of claim 13 further comprising the step of mounting the riser card to a partition wall.

15. The method of claim 14 further comprising the step of positioning the vertical interface circuitry card within the second region of the enclosure adjacent to the partition wall.

16. The method of claim 15 further comprising the steps of:

positioning a power supply and a hard drive within the second region of the enclosure; and positioning a disc drive and an air duct within the first region of the enclosure.

* * * * *